May 3, 1966

A. SILVERSTEIN 3,248,939

AUTOMATIC INSTRUMENTED DIVING ASSEMBLY

Filed May 31, 1962

INVENTOR.
ABRAHAM SILVERSTEIN
BY *OPHodges*
ATTY.

FIG.2.

May 3, 1966    A. SILVERSTEIN    3,248,939
AUTOMATIC INSTRUMENTED DIVING ASSEMBLY
Filed May 31, 1962    7 Sheets-Sheet 3

INVENTOR.
ABRAHAM SILVERSTEIN
BY *DEHodges*
ATTY.

May 3, 1966   A. SILVERSTEIN   3,248,939
AUTOMATIC INSTRUMENTED DIVING ASSEMBLY
Filed May 31, 1962   7 Sheets-Sheet 4

FIG.5.

INVENTOR.
ABRAHAM SILVERSTEIN
BY O.E. Hodges
ATTY.

FIG. 8.

United States Patent Office 3,248,939
Patented May 3, 1966

3,248,939
AUTOMATIC INSTRUMENTED DIVING
ASSEMBLY
Abraham Silverstein, Hyattsville, Md., assignor to the United States of America as represented by the Secretary of the Navy
Filed May 31, 1962, Ser. No. 199,197
6 Claims. (Cl. 73—170)

The invention described herein may be manufactured and used by or for the Government of the United States of America without any royalties thereon or therefor.

The present invention relates to water exploration and more particularly to an instrumented diving assembly capable of submerging to the bottom of the ocean in the deepest portion and obtaining scientific data as to the temperature, pressure, electromagnetic radiation, nuclear radiation and any other physical phenomena capable of being recorded, and after a predetermined period of time the assembly is released and rises to the surface for recovery and subsequent evaluation of the data obtained.

In the field of underwater exploration, it has been the general practice to employ instrumented diving assemblies which are capable of being submerged several thousand feet into the ocean and of obtaining the data required. These assemblies generally have been connected to a ship or a floating vessel by means of a cable and due to the underwater currents they were not able to reach the very bottom of the deepest ocean without breaking the cable since the ocean is seven miles deep. A further limitation is that these assemblies have not been able to withstand the great pressure, up to 20,000 lbs. p.s.i., which are found at the bottom of the ocean.

In recent years the bathyscaphe, developed as a deep sea assembly, is capable of carrying both men and instruments into the deep portions of the ocean. One major disadvantage present in the bathyscaphe is the equipment necessary for submerging and subsequently surfacing the vessel created large magnetic fields which hindered the obtaining of data concerning the electromagnetic radiations present since the magnetic field produced by ballast solenoids in the bathyscaphe were greater than those fields present in the underwater regions due to natural phnomena.

Although the prior art devices worked well for their intended purpose they were unable to obtain data concerning the ocean bottom. The ocean bottom has remained unexplored and one of the possibilities of its use is in the field of communication. In order to use the ocean bottom for communication it is necessary to determine the noise level and electromagnetic radiation which is present in order to determine the requirements of a system which is capable of transmitting along the ocean bottom. The general purpose of this invention is to provide a deep sea exploration apparatus which is capable of submerging itself to the deepest portion of the ocean, withstand the high pressures there present, obtain the desired physical data, record the data obtained, surface after a predetermined time, and initiate the transmission of a coded signal upon surfacing so that the assembly may be detected and subsequently recovered.

An object of the present invention is to provide a new and improved system for detecting and recording the physical phenomena present at the bottom of the ocean.

Another object of the present invention is to provide a new and improved deep sea assembly which is capable of withstanding very high pressures.

A still further object of the present invention is to provide a new and improved deep diving assembly which is unmanned and is capable of submerging itself to the bottom of the ocean and after a predetermined time of resurfacing.

Another object of the present invention is to provide a new and improved antenna system which is capable of detecting electromagnetic radiations from any direction wherein the eddy currents have a reduced effect on the data acquired.

A further object of the invention is to provide a new and improved apparatus for maintaining an equalized pressure within and without the electrical connecting wires within the system.

Other objects and advantages of the invention not at this time enumerated will become apparent as the nature of the invention is better understood by reference to the following detailed description when considered in connection with the accompanying drawings in which like reference numerals designate like parts throughout the figures thereof and wherein.

Figure 1A:
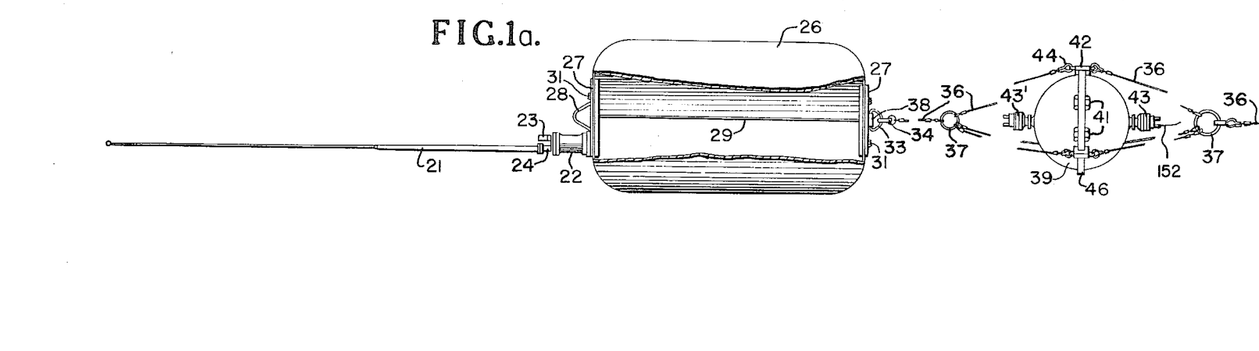
FIGS. 1A and 1B form a schematic view of the assembly and illustrate a preferred embodiment of the invention.
Figure 1B:
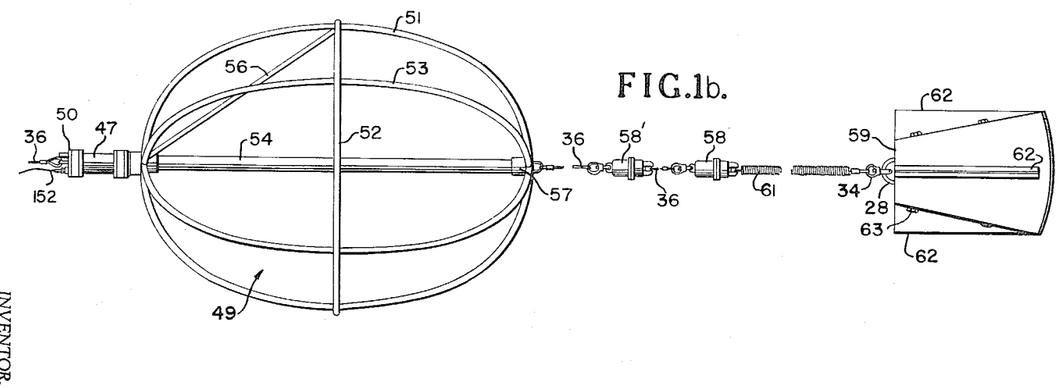
Figure 2:
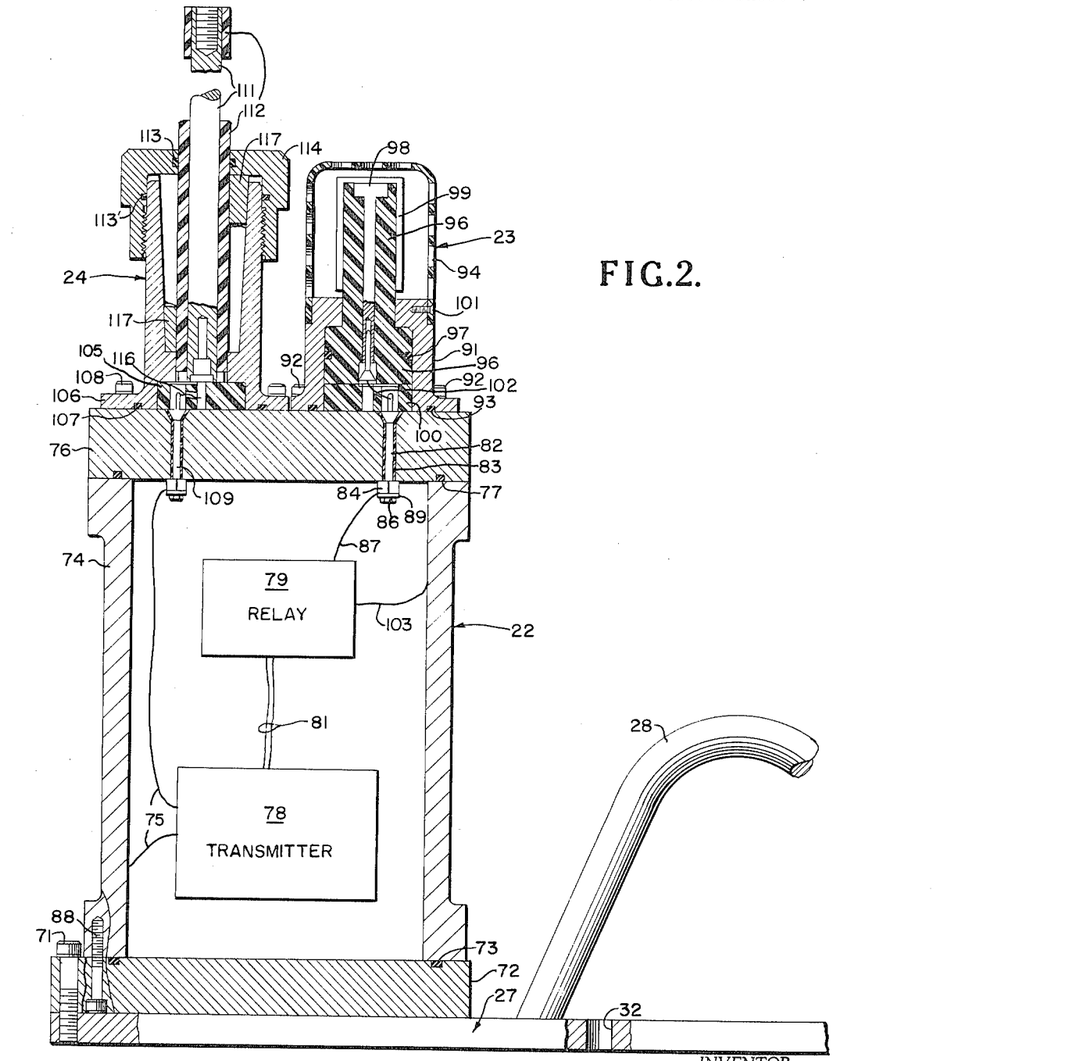
FIG. 2 is an enlarged view, partially in section, of the transmitter housing, transmitter off-on switch, and the antenna mounting assembly.

Referring now to the drawings;

FIG. 1A is a view of some of the various assemblies connected together to form an operative embodiment of the invention. The whip antenna 21 is shown connected to transmitter housing 22 by means of the whip antenna mounting 24. Mounted on top of the transmitter housing 22 is a transmitter off-on switch 23. The transmitter off-on switch 23, described more fully in connection with FIG. 2 is so constructed as to turn the transmitter off when the switch 23 is below the sea water and to turn the transmitter on when the assembly is floating on the surface of the sea. The transmitter mounted in the transmitter housing 22 is of standard commercial construction and is designed to give out a coded signal consisting of a constant frequency signal transmitted for a period of one second and turned off for a period of two seconds. The coded signal generated by the transmitter is fed to the whip antenna 21 which radiates electromagnetic waves in all directions. These electromagnetic waves are detected by suitable direction finding equipment (not shown) of a ship or vessel so that the diving assembly may be retrieved from the ocean. The transmitter housing 22, the transmitter off-on switch 23 and the whip antenna mouning 24 are all designed to withstand pressures up to 20,000 p.s.i. The 20,000 p.s.i. is the maximum pressure which has been found in any of the oceans of the world. Float 26 is of generally cylindrical shape and is constructed of reinforced rubber such as is found in tire carcasses. Attached to each end of the float are a pair of sealing and mounting plates 27. These plates 27 are of circular construction and are mounted in pairs with the rubber of the float sandwiched in between the pair of plates. The rubber of the float 26 is maintained between the two plates by the bolts 31. Within the float 26 a steel cable 29 connects the two plates on either end of the float. The cable is placed within the float so that the entire weight of the assembly is supported by the steel cable being lifted by D-ring 28. The transmitter housing 22 is mounted on one of the sealing and mounting plates 27. Float 26 is filled with a liquid such as gasoline, oil or any other suitable floating means with a requirement for the liquid within the float being that its density be less than that of sea water. A liquid buoyant is used within the float because of the physical property that liquids generally are not compressible and thus the float will be able to withstand 20,000 p.s.i. pressures without being crushed. One of the plates on each end of the float has a hole 32, shown in FIG. 2, drilled into it. The purpose of this hole is to allow the sea water to enter the void between the two plates thus prohibiting the crushing of the plate due to the pressure of the sea water. The sealing and mounting plate 27 on the lower portion of float 26 has a collar 38 for attaching a D-ring 33. The D-ring 33 passes through this collar which allows free movement along one axis perpendicular to the axial direction of the float 26. Attached to the D-ring 33 is a cable connector 34 which is of the U-boat type construction. This allows rotation of a second axis parallel with the surface of the water. Attached to the cable connector 34 in a well known manner is the connecting cable 36. The other end of the connecting cable 36 is connected to an O-ring 37. This O-ring 37 has three additional connecting cables 36 supporting the instrument container 39. The instrument container 39 is shown for illustration purposes only, as a sphere. Instrument container 39 can also be of the closed cylindrical construction, however, a sphere was utilized since the maximum volume for a given amount of steel is obtainable due to the fact that wall thickness of the container is the least in a sphere. With less steel and more buoyant force due to increased volume the payload can be increased for a given buoyant force. The instrument container is designed to be water tight up to a pressure of 20,000 p.s.i. It is constructed of stainless steel and is made in two parts. The two parts are essentially two half spheres joined together by bolts 41 which pass through the flanges 46. The sphere is supported by three connecting cables 36 which are connected to the sphere through suitable cable connectors 44. Cable connectors 44 are of the U-bolt type construction which are connected to the cables 36 and on the other end are connected to the sphere supports 42. The sphere supports 42, are mounted on the flanges 46 and support the weight of the instrument container 39. Attached to the lower portion of the instrument container 39 is a power and wire connector housing 43. The details of this housing will be described later in connection with FIG. 5. The housing 43' attached to the upper portion of the sphere is identical in construction to the lower housing 43 and contains transducers for obtaining temperature and pressure data from the ocean. The sphere 39 is hollow on the inside and contains galvanometer and tape recorders and the power supply for all the instruments. The galvanometer recorder and the tape recorder together with the batteries used as a power supply are of standard commercial construction. Details of the flange construction will be described later in connection with FIG. 4. Connecting the instrument container 39 to the antenna and amplifier housing 47, shown in FIG. 1B, are a series of three connecting cables 36, an O-ring 37 and one further connecting cable 36. These are the same construction as described before.

FIG. 1B is a view of the remaining components of the diving assembly. The power and wire connecting housing 43 is also connected to the antenna and amplifier housing by means of wire 152. This wire 152 is used to transfer the data from the antenna to the recorders positioned inside of the sphere. The detail of the antenna and amplifier housing 47 will be described later in connection with other FIGURES 6A and 6B. Connected to the antenna amplifier housing 47 is the loop antenna generally shown at 49. The loop antenna consists of three loops 51, 52, and 53. The three loops lie in planes mutually perpendicular to each other. The loops are mutually perpendicular to each other in order that they may receive a signal from any direction. The loops are constructed of rubber covered wire so that they form a single turn antenna and are covered with resin bonded glass. The resin bonded glass covering is non-magnetic as well as adding strength and rigidity to the loop antenna. Details of the loop antenna will be described more fully later. The antenna lead in wire 56 connects loop 52 with the antenna and amplifier housing 47. Passing down through the center of the loop is an axial Fiberglas tubing 184. This rod is connected to the antenna and amplifier housing 47 and also connected to the Fiberglas D-ring connector 57. The purpose of this Fiberglas tubing 184 is to carry the axial tension of the device and thus put no strain on the antenna loops themselves. The axial Fiberglas tubing 184 is of hollow tubular construction. The Fiberglas D-ring connector 57 is connected to the time release mechanism 58 by means of cable 36. The time release mechanism 58 is placed between the anchor 59 and the antenna 49. The purpose of a time release mechanism is to release or separate the anchor 59 from the remaining assembly at a predetermined time. The time release mechanism 58 is activated or controlled by a clock mechanism which is connected to a battery. After a predetermined time, the battery fires an explosive and ruptures a bolt within the time release mechanism thus releasing the anchor 59 from the remaining assembly. The release of the anchor allows the other remaining assembly to float to the surface of the water due to the buoyancy of the float 26, FIG. 1a. Two time release mechanisms 58 and 58' are employed in series connected by a cable 36 to insure that at least one will release the mechanism. Since the whole test would be frustrated without the release of the mechanism two release mechanisms were employed as a safety factor to insure that the assembly would rise to the surface of the water. Connecting the second or lower release mechanism 58' to the anchor 59 is a coil spring 61, whose purpose is to absorb the shock due to the sudden changes in the anchor. The anchor is connected to the coil spring by suitable cable conenctor 34 attached to a D-ring 28 which is embedded in the concrete anchor 59. Attached to the concrete anchor 59 are a plurality of fins 62 attached by bolts 63. The purpose of the fins is to maintain stability as the assembly descends from the surface to the bottom of the ocean.

FIG. 2 is an enlarged view of the transmitter housing 22, transmitter off-on switch 23 and the whip antenna mounting 24. The transmitter housing 22 is connected to the sealing and mounting plates 27 by means of bolts 71 which pass through the base 72. The main body portion 74 is cylindrical shaped and is connected to the base by means of bolts 88. The flat surfaces between the base 72 and the cylindrical portion 74 are sealed by a neoprene O-ring 73. The top 76 is connected to cylindrical body portion 74 by means of bolts (not shown) and sealed with a second neoprene O-ring 77. Enclosed in the cylindrical body 74 is a transmitter 78 shown in a block diagram form since the transmitter is of a standard commercial construction and is of a type well known in the art. Transmitter 78 is connected between ground and the antenna connector 109 by leads 75. Connected to the transmitter 78 by means of a pair of wires 81 is an off-on switch relay 79. This off-on switch relay 79 is connected to an electrical go-through connector 82 by means of a wire 87. The electrical go-through connector allows an electrical connection to be made from outside the cylindrical body while maintaining a pressure seal to the outside pressure. This electrical go-through connector 82 is the same shape but of smaller dimensions than the hole drilled in the top 76. The connector is placed in the top and is insulated from the metallic top 76 by means of a polytetrafluoroethylene 83. The pressure is maintained on the electrical go-through connector by means of the insulator 84 which is maintained in tension by washer 89 secured by the nut 86 on the electrical go-through connector 82. The transmitter off-on switch shown generally at 23 is an electrical conductivity switch in which the sea water closes the circuit and the absence of sea water opens the circuit. The switch is constructed of a base 91 which is connected to the top 76 by means of bolts 92. The base 91 is sealed to the pressure of the sea water by means of the O-ring 93 which is in compression between the top 76 and the base 91. Within the base 91 there is an insulator 96 which is sealed to the base by O-ring 97 and an insulator 100 between top 76 and insulator 96. In the center of the insulator 96 there is an electrical conductor 98 which passes from the top of the bottom and is sealed to the insulator. Connected to the top of this conductor 98 is a metallic cap 99 which covers a substantial portion of the insulator 96. The conductor 98 passing through the insulator 96 is connected to the go-through connector 82 by means of electric wire 102. Attached to the base 91 is a plastic cover 94 attached by suitable screws 101. This plastic cover has a hole to allow sea water to freely pass through this cover. The purpose of the cover is merely as a protection for the switch 23 in order that the insulator 96 will not be cracked or broken due to any slight blows. The void or hollow portions within the base 91, which are within the O-ring 93 and 97, are filled with oil. The purpose of this oil is to equalize the pressure within the switch to the atmospheric or sea water pressure. Any passage of the sea water into the inner chamber, where the transmitter 78 is present, would first have to pass through the oil within the off-on switch. This sea water switch or electrical conductivity switch 23 operates on the principle that if sea water touches the cap 99 and the base 91 a circuit is closed and thus allowing a connection between the base 91 through the top 76 and cylinder wall 74 to the relay 79 through the wire 103 and from the relay through the wires 87 and 102 back to cap 99 through the center conductor 98 thereby completing a circuit. In the absence of sea water this circuit is broken due to the fact that the connection is broken between the cap 99 and the base 91. A whip antenna mounting is shown generally at 24 which consists of a base 106 connected to the top 76 by means of bolts 108 and is sealed to the pressure by means of O-ring 107. A go-through connector 109 connects the inside of the cylindrical chamber 74 with the antenna mounting in a similar manner as go-through connector 82. The whip antenna 111 is covered by a plastic shield 112 which, together with the antenna and the shield, extend to the bottom of the whip antenna mounting. An electrical connection between the go-through connector 109 and the stainless steel antenna 111 is made by the electrical connector 116 which is surrounded by insulator 105. The inside of the base 106 is tapered and a shim 117 is inserted therein in order to rigidly secure the antenna within the housing. Fitting onto the threaded portion of the body 106 is cap 114 which has two O-ring seals 113 and 113' which seal the antenna housing to sea pressure both on the base 106 and on the plastic 112. When the cap is screwed down tightly the shim exerts pressure on the plastic and thus rigidly secures the whip antenna to the antenna housing. All of the metallic surfaces exposed to the sea water are made of stainless steel since this does not corrode. The voids inside the whip antenna housing are filled with oil for the same reason that the off-on conductor switch is filled with oil.

Figure 3:
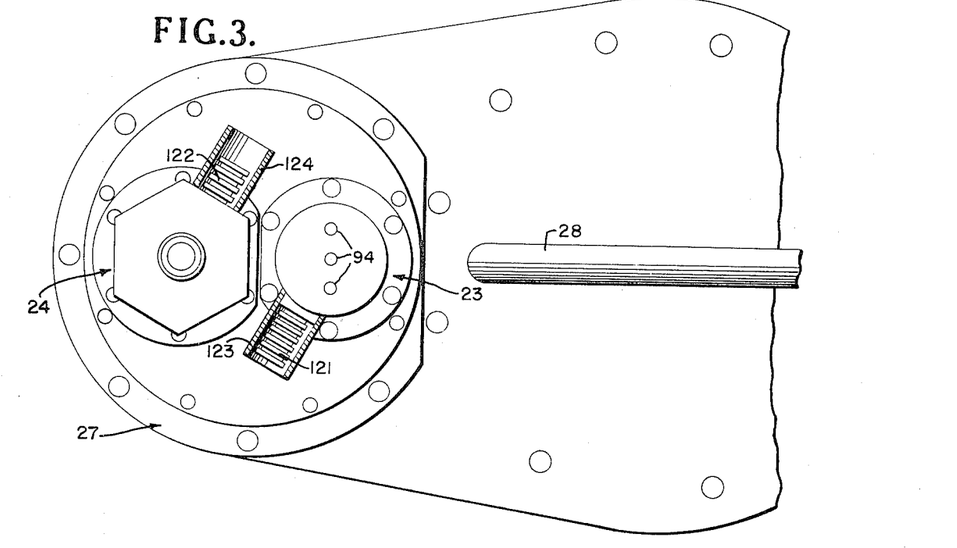
FIG. 3 is a top view of the assembly shown in FIG. 2.

FIG. 3 is a top view of the transmitter housing. There is shown generally the sealing and mounting plate 27, the whip antenna mounting 24, transmitter off-on switch 23, and the D-ring 28. Attached to transmitter off-on switch 23 is a Sylphon bellows 121 which is surrounded by a metallic like shield 123 which is opened at the top. The shield containing the Sylphon bellows is attached to switch 23 in a manner more fully described with reference to FIG. 5, such that oil in the void of insulator 100 (FIG. 2) exerts pressure on the bellows. The purpose of the Sylphone bellows is to maintain or equalize the pressure on the oil within the interior of the chamber in the transmitter off-on switch with that on the outside either sea pressure or atmospheric pressure. Attached to the whip antenna housing mounting 24 is a second Sylphon bellows 122 with a shield 124 open at one end and of metallic construction for the purpose of protecting the Sylphon bellows from any blows. Sylphon bellows 122 has a connection to mounting 24 such that oil in the void of insulator 105 (FIG. 2) exerts pressure on the bellows for the same purpose described for the transmitter on-off switch.

Figure 4:
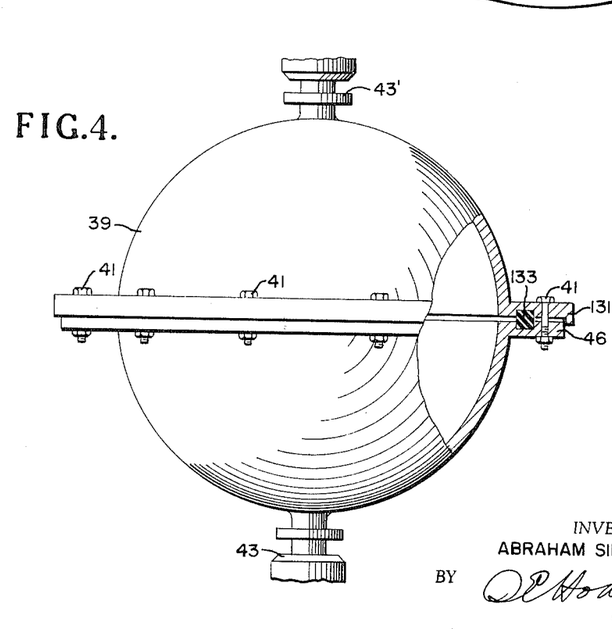
FIG. 4 is an enlarged sectional view, partially broken away, of the instrument sphere sealing ring assembly.

FIG. 4 is an enlarged view which illustrates the manner in which the two half-spheres are joined together. One of the half-spheres has a lip 131 which protrudes over the other half-sphere and the flat flange surface 46. The purpose of this lip is to eliminate any strain which would tend to shear the bolts 41. Bolts 41 join the two half-spheres together and the O-ring 133 placed in between the two half-spheres insures that the sphere will be sealed to the sea water pressure.

Figure 5:
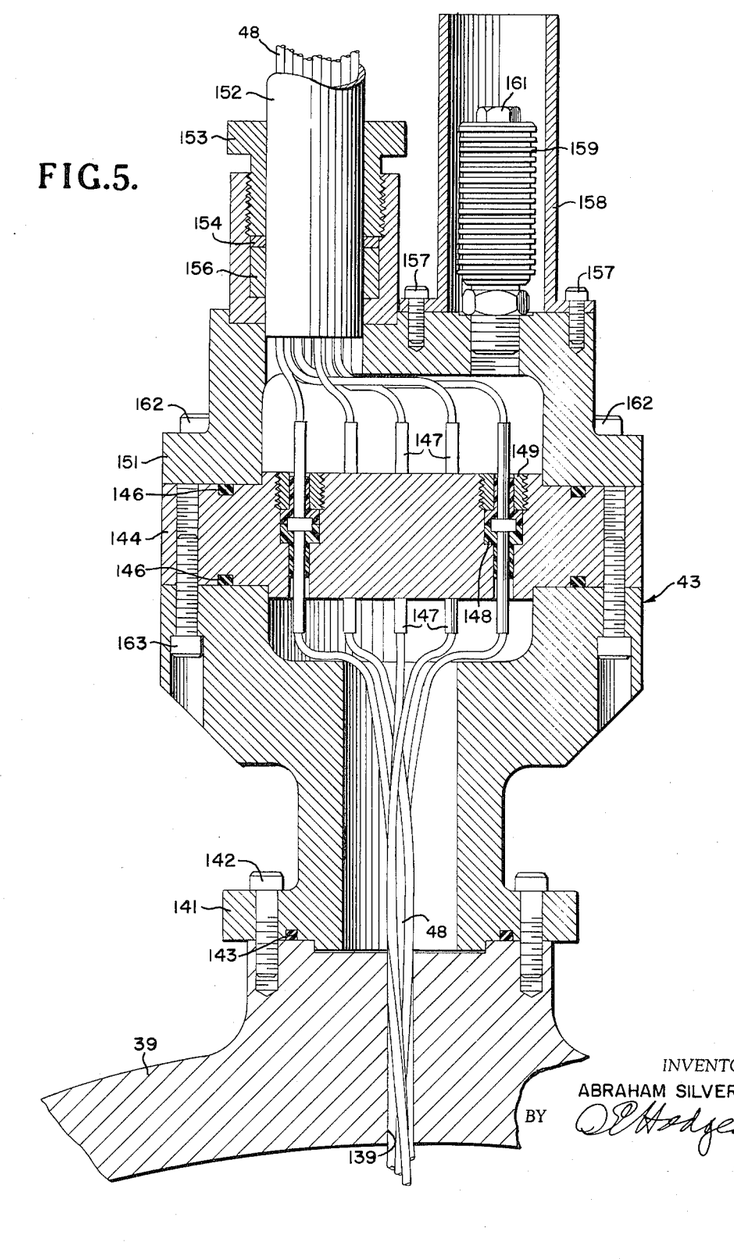
FIG. 5 is a greatly enlarged view, partially in section, of the electrical junction terminal box.

FIG. 5 is an expanded view of the power and wire connector housing which is connected to the instrument container 39. In the sphere 39 there is a hole 139 extending therethrough to allow the passage of wires into and out of the sphere. The wires disposed within this hole are connected to the terminal board 144. This power and wire connecting housing is attached to the sphere by means of bolts 142 which attach the base 141 to the sphere 39 and a seal is maintained by means of the O-ring 143 in a manner as described before. The terminal board 144 is sandwiched in between the base 141 and the top portion of the connector housing 151. A seal is maintained between these three components by means of a pair of O-rings 146 which are held in compression by bolts 162 and 163. The terminal board 144 has a plurality of electrical go-through connectors 147 which are inserted in holes within the terminal board. Surrounding the go-through connectors and insulating the connectors from the metal of the terminal board is an epoxy resin 148. A small pressure is maintained on the go-through connectors by the hollow bushing 149 which is screwed into the terminal board 144. As a pressure increases on a side of the terminal board in which the bushing 149 is present it applies a pressure to the go-through connectors 147 which tend to apply a greater pressure to the epoxy resin 148. The wires 48 coming from the sphere are connected to the electrical go-through connectors 147. This chamber or volume is filled with air at atmospheric pressure. The wires enter the housing through electrical cable conductor 152. The cable is sealed against sea pressure by means of rubber washer 156 which is held in compression by the steel washer 154 as the nut 153 is tightened down against the metal washer 154. The chamber bounded by the terminal board 144 and the top 151 is filled with oil.

Attached to the top of the housing 151 is a Sylphon bellows 159. Surrounding the Sylphon bellows 159 is a metallic shield 158 attached to the top by bolts 157. The purpose of the shield is to protect the bellows from shock or accidental damage through hitting other objects. A plug 161 is attached to the top of the Sylphon bellows 159 so that upon its removal oil may be inserted into the chamber and completely fill the chamber bounded by the terminal board 144, the top 151 and filling the Sylphon bellows 159. After the oil has been inserted, the plug 161 is reinserted. The purpose of the Sylphon bellows is to allow the pressure on the oil within this chamber to adjust to the outside pressure, either the atmospheric pressure or the pressure produced by the sea, as the case may be. The presence of the oil within the chamber is an added insurance against the short circuiting of the wires within the cable as well as the housing. The oil being an insulator and not compatible with the sea water plus the fact that the oil is substantially under the same pressure as the sea water there is little chance that the sea water would enter and cause a short circuit between the various terminals within the cable 152. Cable 152, due to the fact that the oil is under the pressure of the sea water need be of no special construction since the pressure inside the cable is equal or nearly equal to the external pressure whether it be atmospheric or sea water pressure up to 20,000 p.s.i.

The element 43', attached to the opposite end of the instrument container 39, is identical in all respects to the element 43, with the following exceptions. The cable 152 is replaced with the temperature responsive element and the Sylphon bellows 159 is replaced with a pressure responsive transducer which detects the pressure of the sea water. The cavity between the terminal board 144 and 151 is filled with air at atmospheric pressure rather than oil. The number of go-through connectors in terminal board 144 is reduced to accommodate the number of wires due to the pressure and temperature responsive elements. These elements are not shown on the drawing since it is a mere substitution of parts well known and old in the art.

Figure 6A:
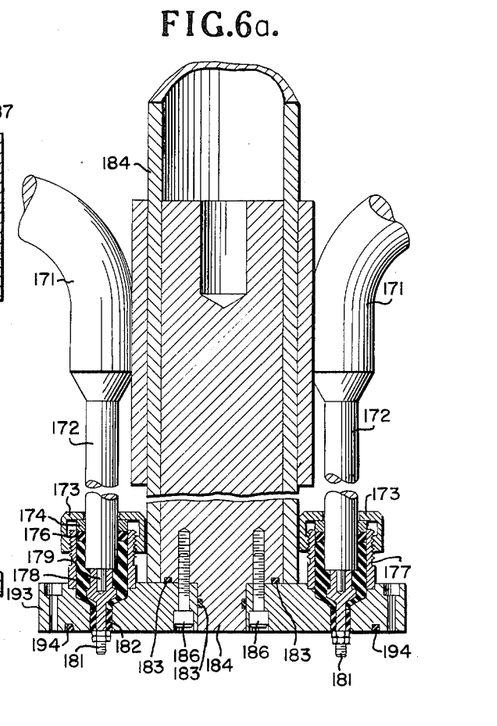
FIGS 6A and 6B form an enlarged view, partially in section, of the amplifier housing and antenna junction housing.
Figure 6B:
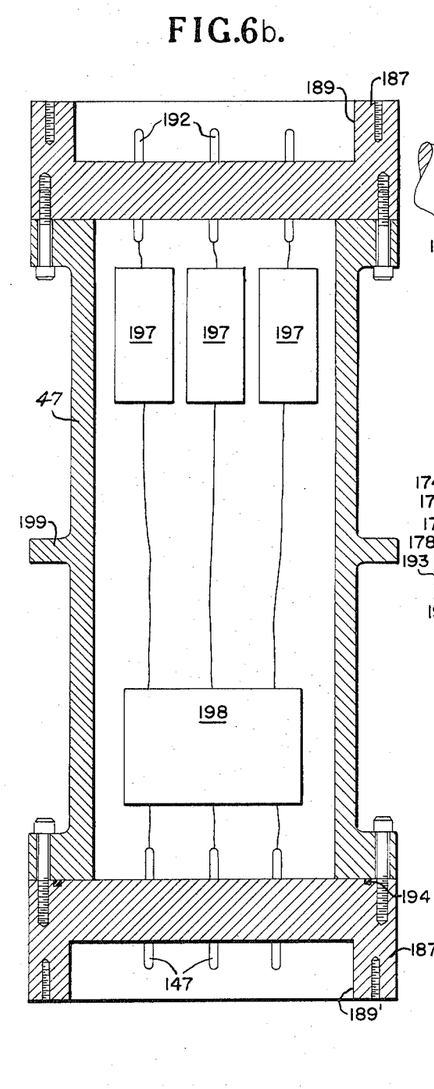

FIGS. 6a and 6b form an enlarged view partially in section, of the amplifier housing 47 together with the antenna lead-in conductors in one end and the cable carrying the power and data to an instrument sphere lead-in from the other end. The antenna lead-in wires from one of antenna loops 51, 52 or 53 are shown with the epoxy resin tape covering 171 which surrounds the rubber covered wire 172 as has been previously described. The rubber covered wire 172 has a special rubber end 178 molded to the end of the conductor. The shape is as shown in the diagram. The lead-in wire 172 is secured to the amplifier housing by means of nut 173 which is tightened down on a metal washer 174 which in turn compresses the rubber gasket 176. The nut 173 is fastened onto the boss 177. The rubber covered conductor 172 has a concentric conductor 179 which is attached to the electrical conductor 181 which connects with one of the leads 192 in terminal board 187. The connector 181 is insulated from the housing 193 by insulator 182. A plurality of O-ring seals 183 seal the oil filled chamber 189 from the sea pressure present around the load bearing shaft of Fiberglas tubing 184. A plurality of bolts 186 secure the shaft of the tubing 184 to the amplifier housing. The antenna lead-in housing 193 is connected to the terminal board 187 and is sealed against sea pressure by suitable O-rings 194. The chamber 189 formed by the terminal board and the antenna lead-in housing is an oil filled chamber which is maintained at the pressure of the sea for the same reasons as has been explained in regard to FIG. 5. Attached to the terminal board 187 is a Sylphon bellows (not shown) which is identical to the previously described Sylphon bellows. The bellows may be attached in a manner described with reference to FIG. 5 so that it communicates between oil chamber 189 and the outside of housing 187. The oil filled chamber 189 is electrically connected to the interior of the amplifier housing 47 by suitable go-through connectors 192 in which three are shown for illustrative purposes. The hardware surrounding go-through connectors 192 is identical to that as explained and shown in FIG. 5. The interior of the amplifier housing 47 houses the three transformers for the antenna loops. Transformers 197 are connected to the amplifier and cathode follower 198. The circuitry of the transformer, amplifier and cathode follower will be described more fully hereinafter. The amplifier housing 47 is substantially cylindrical in shape with a protrusion 199 formed as an integral portion thereof for the purpose of strengthening the cylinder walls to withstand the 20,000 p.s.i. pressure. The output of the cathode follower is connected to go-through connectors 147 which are connected to the wires present in the rubber covered conductor 152 (FIG. 1b). The hardware surrounding connectors 147 is also identical to that shown in detail in FIG. 5. The electromagnetic radiation detected by the antenna loop is fed to the amplifier within the amplifier housing through a suitable oil chamber 189' which is at the same pressure as the sea surrounding the diving instrument and from thence the wires are connected from the oil filled chamber 189 to the interior of the amplifier housing 47 where the signal is amplified to a sufficient degree so that it may be recorded on the recorders present in the instrument sphere. The amplifier is connected to the instrument sphere by means of electrical conductors which pass from the interior of the amplifier housing 47, which is at normal atmospheric pressure, through housing 187' into an oil filled chamber 189' and from thence by means of go-through connectors are connected to proper conductors which lead to the instrument sphere in a manner similar to that shown in FIG. 5.

Figure 7:
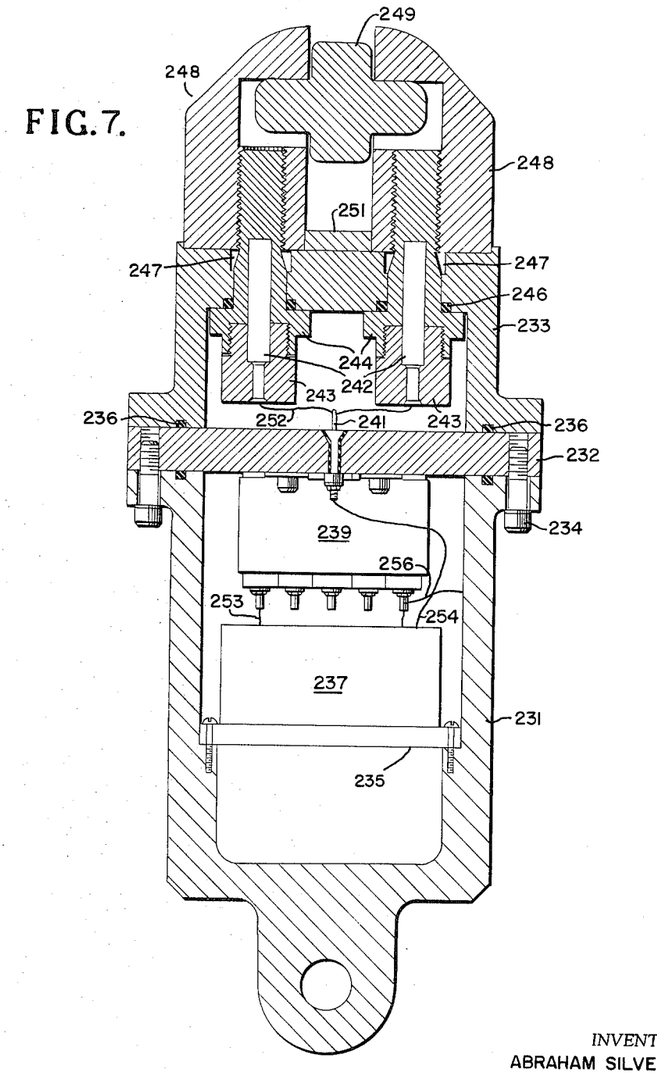
FIG. 7 is an enlarged view, partially in section, of the time explosive release mechanism.
Figure 8:
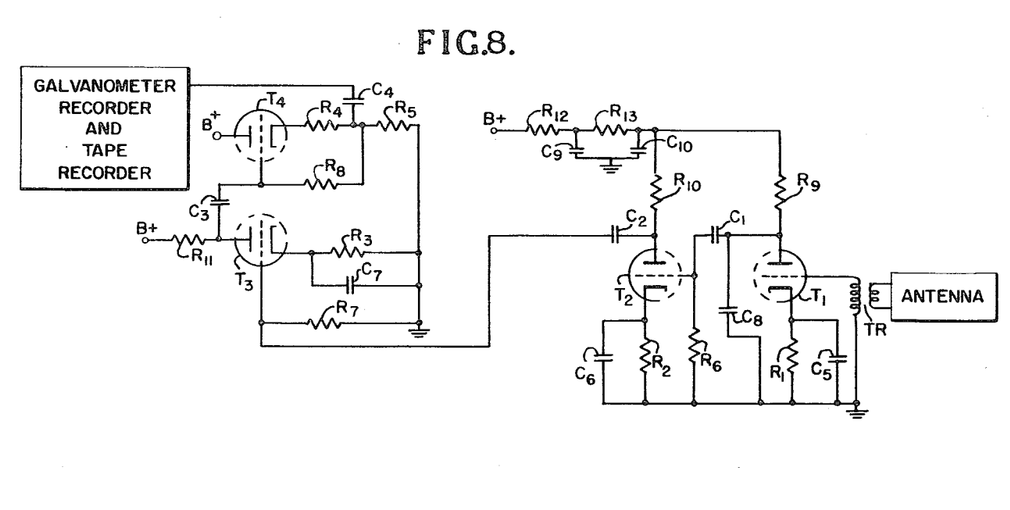
FIG. 8 is a schematic diagram of the typical circuitry suitable for recording the electromagnetic radiations of the antenna onto suitable recording means.

FIG. 7 is an enlarged view of the explosive release mechanism of FIG. 1b. The explosive release mechanism consists of a body portion 231 with a terminal board 232 placed in between the body portion 231 and the body portion 233 and joined together by suitable bolts 234 and sealed against sea pressure by suitable O-rings 236. A battery 239 is used to power the explosive release devices which are controlled by the clock mechanism 237. This portion containing the clock 237 and the battery 239 is sealed against the sea water pressure and is filled with air at atmospheric pressure. The terminal board 232 has a go-through connector 241 which electrically connects the two chambers while maintaining pressure sealed between them. The construction of this go-through connector is identical to those described in relation to FIG. 2. A second chamber disposed by the terminal board 232 and the body portion 233 is filled with oil and is sealed against sea pressure by O-rings 236 and 246. Two explosive bolts 244 which are partially drilled axially through the center as shown in the drawing pass through this chamber and are attached to the retaining lugs 248. Within each of the holes in the two explosive bolts 244 an explosive charge 242 is inserted which is held in place by a screw on cap 243. In the body portion 233 a cutout 247 is provided for an explosion expansion chamber. The two retaining lugs 248 and 248' cooperate to hold cable connector 249 in place. The ledge 251 is provided to prevent the shearing of the retainer lugs 248 and 248' due to the stress placed on them by cable connector 249. Two wires 252 connect the explosive charges 242 with the go-through connector 241. The clock 237 held in place by horizontal bar 235 is a standard commercial type in which a predetermined time is set for closing a switch. When the switch is closed by the clock 237 a circuit is completed at one terminal of the battery 239 through the conductor 253 through the switch in the clock 237 (not shown) through the conductor 254 which is connected to the go-through connector 241 and from thence to conductors 252 to the two explosive release charges 242. The right terminal of battery 239 is connected to the housing 231 for grounding over lead 256. The circuit is completed through the body portion comprising the cap 243, the explosive bolt 244, the body portion 233, the terminal board 232 and the body portion 231 in returning through conductor 256 to the battery 239. The closing of the circuit causes the explosives within the bolt 244 to explode and the bolt 244 is sheared due to the explosion at the point where the explosion expansion chamber 247 is cut into the body 233. The shearing of either one or both of the bolts 244 releases either one or both of the lugs 248 which in turn releases the cable connector 249 and thus freeing the assembly from the anchor. When the instrument assembly is freed from the anchor, the entire assembly without the anchor rises to the surface of the water due to the buoyant action of the float 26, FIG. 1a.

FIG. 9 is a schematic diagram of the typical amplifier and cathode follower circuitry used in converting the signal received by the antenna to a signal which is capable of being recorded by the galvanometer recorder and a tape recorder. The signal is detected by the antenna, shown as the block designated ANTENNA. The signal is then stepped up in a transformer TR which is a 1:1,500 step-up transformer. The output of the transformer is connected to the first stage amplifier tube $T_1$ which may be one-half of a 6072 dual triode amplifier tube. The output of the transformer TR is connected to the grid of the tube $T_1$ which amplifies the signal. The output of tube $T_1$ taken from the plate is capacitively connected through capacitor $C_1$ to the grid of tube $T_2$ which is the second half of 6072 dual triode amplifier. The signal is here amplified again and is capacitively coupled through capacitor $C_2$ to a third stage of the amplifier $T_3$. $T_3$ may be one-half of a 5051 dual triode amplifier tube. The signal is then amplified in tube $T_3$ and the output is taken off the plate and capacitively coupled by capacitor $C_3$ to the grid of tube $T_4$ which may be the second half of 5751 dual triode amplified tube. The signal is amplied in the tube $T_4$ and the output is taken from the junction between resistors $R_4$ and $R_5$. This output is the cathode follower output and is capacitively coupled through capacitor $C_4$ to both the galvanometer recorder and tape recorder. Capacitors $C_5$, $C_6$ and $C_7$ are A.C. by-pass capacitors between the cathode and ground. Resistors $R_1$, $R_2$ and $R_3$ are bias resistors to produce the proper bias on the cathodes of the respective tubes. Resistors $R_4$ and $R_5$ form a voltage dividing network in order that a low voltage cathode follower output may be obtained. Resistors $R_6$, $R_7$ and $R_8$ are bias resistors for the respective grids of the tubes to which they are connected. Resistors $R_9$, $R_{10}$, and $R_{11}$ are load resistors for the various tubes to which they are connected. Capacitor $C_8$ is a high frequency by-pass capacitor between the plate and the cathode of tube $T_1$. The filter network resistor comprises resistors $R_{12}$, $R_{13}$, and capacitors $C_9$ and $C_{10}$ which maintain a more nearly constant plate voltage for tubes $T_1$ and $T_2$. The amplifier and cathode follower of FIG. 9 operate in a well known manner and the various values of the resistors and capacitors which may be utilized to make an operative embodiment are given in Table I.

Table I

Resistance in ohms:

| | |
|---|---|
| $R_1$ | 2.7K |
| $R_2$ | 2.7K |
| $R_3$ | 5.6K |
| $R_4$ | 1.8K |
| $R_5$ | 100K |
| $R_6$ | 100K |
| $R_7$ | 270K |
| $R_8$ | 470K |
| $R_9$ | 20K |
| $R_{10}$ | 20K |
| $R_{11}$ | 470K |
| $R_{12}$ | 8.2K |
| $R_{13}$ | 8.2K |

Capacitance in microfarads:

| | |
|---|---|
| $C_1$ | 4 |
| $C_2$ | 4 |
| $C_3$ | 1 |
| $C_4$ | 4 |
| $C_5$ | 200 |
| $C_6$ | 200 |
| $C_7$ | 200 |
| $C_8$ | 47 |
| $C_9$ | 30 |
| $C_{10}$ | 30 |

The operation of the automatic instrumented diving assembly will now be described. The assembly is so constructed so as to accommodate itself both to the conditions present at sea level on board a ship as well as those present in the deep sea up to the depth of seven miles which is the deepest portion of the sea that is known today. The metal portions of the assembly which are exposed to sea water have been constructed of stainless steel due to the characteristics of having both high tensile strength as well as resistivity to the elements present both in the atmosphere and in the sea. The float is made preferably of a flexible rubber construction or any of the synthetic varieties thereof suitable for the purpose in order that it may accommodate both temperature and pressure changes. Since the float 26, FIG. 1a, is filled with gasoline which expands greatly in the presence of sunlight, the float must be able to accommodate this expansion and still be safe on board ship. While in the sea water the float must be able to withstand the great pressures present in the sea up to 20,000 pounds per square inch. Flexible rubber construction allows the float to absorb the shock while on board ship and when submerged in water it is able to be compressed a small amount due to the pressure of the sea water. The sphere 39, FIG. 1a, must also be able to absorb this shock present on the ship as well as withstanding the pressures of the sea. The loop antenna 49, FIG. 1b, presented a special problem in that it had to be rigid as well as being sensitive to very minute electromagnetic radiations present in the deep sea. The loop antenna was designed as a pressure resistive magnetic loop detector for electromagnetic noise background detection within a range of 20 to 1,000 cycles per second at a very low intensity. The antenna is constructed of a 10-foot diameter single turn loop made preferably of insulated number 6 stranded wire. This wire is wrapped with a glass cloth epoxy resin which is thereafter cured and gives the loop antenna the rigidity that is required as well as being pressure resistant. The glass epoxy resin produces two results; one, giving the necessary strength to the loop wire and secondly provides an installation which is required over the loop antenna. In the antenna conductors there are present eddy currents which seriously hinder the detection of a very low intensity noise background which is the purpose to determine. The glass epoxy resin respectively insulates the antenna from the sea water, which is a good conductor, and the eddy currents which are present are reduced due to the thick insulation surrounding the antenna conductors. The presence of three loop antennas which are mutually perpendicular to each other in different planes gives an omni-directional antenna which is capable of detecting radiation in any direction. These very small electromagnetic radiations detected by the loop antennas are fed into a step-up transformer whose ratio is 1/1,500 and from then it is amplified in two stages of a dual triode amplifier. The dual triode amplifier is fed into a second dual triode amplifier for further amplification and the output is taken from the cathode follower of the second half of the second dual triode amplifier. This output is utilized by the recordings both on the galvanometer recorder and the tape recorder. The galvanometer recorder is also utilized to make a continuous recording of the temperature and pressure as the instrument descends, while it remains at the bottom, and while it ascends to the surface.

The sequence of events on a typical dive will now be described. As the assembly starts to submerge water covers the sensitive switch on the transmitter 23 and turns the transmitter off. As the assembly is submerged a constant record is kept by the galvanometer recorder of the temperature and pressures present in the ocean within the immediate vicinity of the device. The assembly descends to the bottom of the ocean and the spring 61 absorbs the energy of the float on the rebound of the overshoot as the float attempts to resurface. While at the bottom of the ocean the tape recorder and the galvanometer together record the outputs from the temperature and pressure responsive instruments as well as any other recordings which may be desired during the entire stay at the bottom of the ocean. After the predetermined time has occurred a clock in the explosive release mechanism 58 will cause the bolts to explode and release the assembly from the anchor. At this time due to the positive buoyancy of the float the assembly will rise to the surface of the water. The instruments during this entire time are continually recording the physical phenomena encountered in the ocean. Upon surfacing, the sea water sensitive switch 23 will become an open circuit and a relay controlled thereby will actuate the transmitter to start transmitting the coded signal which may consist of a constant frequency on for one second and off for two. The effective range of the transmitter is approximately 100 miles. Suitable direction finding equipment placed on a vessel can pick up the signal transmitted by the transmitter and the assembly can be found.

Various modifications are contemplated and may obviously be resorted to by those skilled in the art without departing from the spirit and scope of the invention, as hereinafter defined by the appended claims, as any preferred embodiment thereof has been disclosed.

What is claimed is:

1. An unmanned deep sea diving assembly for obtaining data concerning physical phenomena present in the ocean comprising a submerging means for carrying the assembly to the bottom of the ocean, a surfacing means for carrying the assembly to the surface of the ocean after the assembly has been submerged for a predetermined time, a transducer means producing an electrical output connected between the submerging and surfacing means for detecting the physical phenomena, a recorder for recording the electrical output of the transducer means, a plurality of conductors connecting the transducer means with the recorder, a first sealed high pressure chamber having a small aperture therethrough and housing the conductors connected thereto, a pressure sensitive bellows connected to the outside of said first chamber covering said aperture and communicating with said first chamber, a dielectric fluid filling the first chamber and bellows through said aperture, a second sealed chamber at atmospheric pressure housing the recorder and the conductors connected thereto, terminal means separating the first chamber from the second chamber having a plurality of go-through connectors for electrically connecting the conductors within the first chamber to the conductors within the second chamber while maintaining a pressure differential between the first and second chambers.

2. Apparatus sealing a high pressure chamber from a low pressure chamber and having a plurality of connectors for electrically connecting conductors together comprising a first chamber under high pressure, a second chamber under relatively low pressure, a terminal board mutually connected to the first chamber and second chamber for sealing the two chambers from each other, each of said plurality of electrical conductors having an elongated body of small cross section area with an integral large cross section portion midway between the ends of the body, said terminal board having a plurality of holes therein between the first chamber and the second chamber and having a larger diameter presented to the high pressure chamber than to the low pressure chamber, a seat conforming in shape to the large cross section portion of the body of the conductor formed each of the holes, an epoxy resin connecting the seat and the large cross section portion together whereby an insulator is formed between the terminal board and the conductor, and the low pressure chamber is electrically connected to the high pressure chamber.

3. An unmanned instrumented deep sea diving assembly for obtaining scientific data from the depths of the ocean comprising; an anchor for submerging the assembly, an instrumented container for obtaining physical data from the depths of the ocean; a time release means connected between said anchor and said container for disconnecting said container from said anchor after a predetermined time, and a float means attached to said container for returning said container to the surface of the water after release from the anchor by said release means, means attached to said instrumented container for passing wires through the wall of said container comprising a hole in said container, a pressure resistant housing attached to the outside of said container and covering said hole, an electrical terminal board attached to the outside of said housing, a plurality of electrical go-through conductors passing through said terminal board, a resilient dielectric separating the conductors from the terminal board, said dielectric having a large area exposed to the pressure outside said terminal board whereby a high pressure seal is maintained by the interaction of the conductor with the dielectric.

4. A device as recited in claim 3 wherein an oil filled junction box is attached to the outside of said terminal board, a Sylphon bellows is attached outside said junction box for equalizing the pressure inside the box to the pressure outside, a plurality of wires passing through said junction box and connecting the go-through conductors, and a seal encircling the wires entering the junction box for absorbing strain on the wires produced by the sea water.

5. An unmanned instrumented deep sea diving assembly for obtaining scientific data from the depths of the ocean comprising; an anchor for submerging the assembly, an instrumented container for obtaining physical data from the depths of the ocean; a time release means connected between said anchor and said container for disconnecting said container from said anchor after a predetermined time, and a float means attached to said container for returning said container to the surface of the water after release from the anchor by said release means including a transmitter for sending a code signal upon the surfacing of the assembly whereby the location of the assembly may be determined by receiving of the code signals, a loop antenna connected between said container and said release means for determining the electromagnetic noise background in the depths of the ocean, a sealed chamber attached to said instrumented container for passing wires through the wall of said container having a device preventing seepage of an electrically conductive fluid into said chamber, a dielectric liquid filling said chamber, flexible means for equalizing said pressure connected to and in fluid communication with the chamber, an electrically conductive liquid under high pressure surrounding the chamber and exerting pressure on the exterior portion of the flexible means, whereby the pressure of the dielectric liquid is maintained substantially equal to the pressure of the conductive liquid thereby to prevent seepage of the dielectrically conductive fluid into said chamber.

6. An unmanned deep sea diving assembly for obtaining data concerning physical phenomena present in the ocean comprising a submerging means for carrying the assembly to the bottom of the ocean, a surfacing means for carrying the assembly to the surface of the ocean after the assembly has been submerged for a predetermined time, a transducer means producing an electrical output connected between the submerging and surfacing means for detecting the physical phenomena, a recorder for recording the electrical output of the transducer means, a plurality of conductors connecting the transducer means with the recorder, a first sealed high pressure chamber having a small aperture therethrough and housing the conductors connected thereto, a second chamber under relatively low pressure housing the recorder and the conductors connected thereto, a terminal board mutually connected to the first chamber and second chamber for sealing the two chambers from each other, each of said plurality of electrical conductors having an elongated body of small cross section area with an integral large cross section portion midway between the ends of the body, said terminal board having a plurality of holes therein between the first chamber and the second chamber and having a larger diameter presented to the high pressure chamber than to the low pressure chamber, a seat conforming in shape to the large cross section portion of the body of the conductor formed in each of the holes, an epoxy resin connecting the seat and the large cross section portion together whereby an insulator is formed between the terminal board and the conductor, and the low pressure chamber is electrically connected to the high pressure chamber.

References Cited by the Examiner

UNITED STATES PATENTS

| | | | |
|---|---|---|---|
| 2,103,838 | 12/1937 | Bach | 285—238 |
| 2,244,939 | 6/1941 | Carlson | 285—238 |
| 2,447,069 | 8/1948 | Holcomb | 340—2 |
| 2,641,755 | 6/1953 | Bartelink | 343—100 |
| 2,641,756 | 6/1953 | Dodington | 343—100 |
| 2,782,249 | 2/1957 | Martin | 174—70 |
| 2,839,920 | 6/1958 | MacAnespie | 73—170 |
| 2,967,481 | 1/1961 | Semon et al. | 102—16 |
| 3,069,905 | 12/1962 | Erdely | 73—170 |
| 3,094,928 | 6/1963 | Costley et al. | 102—10 |
| 3,101,387 | 8/1963 | Mihran | 174—18 |
| 3,135,199 | 6/1964 | Brown | 102—19.2 |
| 3,141,922 | 7/1964 | Dirienzo | 174—18 |

OTHER REFERENCES

Gaul et al.: Marine Sciences Instrumentation, New York Plenum Press, 1962, published May 16, 1962, GC 41 M35 1961, pages 21–24 and 321 relied upon.

Parnum, D. H.: Underwater Measurements of Magnetic Field, in Institution of Electrical Engineers, vol. 93, part I, No. 70, October 1964, pages 435–446.

Pochapsky, T. E.: Exploring Subsurface Waves With Neutrally Buoyant Floats, in I.S.A. Journal, October 1961, pages 34–37 (pages 34 and 35 relied upon).

Walden et al.: Buoy Telemeters Ocean, in Electronics, vol. 30, No. 6, June 1, 1957, pages 164–167.

RICHARD C. QUEISSER, *Primary Examiner.*

K. CLAFFY, DAVID SCHONBERG, *Examiners.*

M. KRAUS, J. JOSEPH SMITH, JR., *Assistant Examiners.*